United States Patent [19]

Prodinger

[11] 4,451,864

[45] May 29, 1984

[54] MAGNETIC-TAPE CASSETTE

[75] Inventor: Arnold Prodinger, Vienna, Austria

[73] Assignee: U.S. Philips Corporation, New York, N.Y.

[21] Appl. No.: 414,154

[22] Filed: Sep. 2, 1982

[30] Foreign Application Priority Data

Mar. 9, 1982 [AT] Austria ................................. 941/82

[51] Int. Cl.³ ........................ G11B 15/60; G03B 1/04
[52] U.S. Cl. .............................. 360/130.33; 242/197; 242/199
[58] Field of Search ............................. 242/197–200, 242/208–210, 55, 19 A, 194; 226/195, 196, 198; 360/130.3–130.33

[56] References Cited

U.S. PATENT DOCUMENTS 3,932,893  1/1976  Singer ............................ 360/130.33

Primary Examiner—Leonard D. Christian
Attorney, Agent, or Firm—David R. Treacy

[57] ABSTRACT

A magnetic-tape cassette of the type having an opening in a side wall along which the magnetic-tape extends, for insertion of a magnetic head through the opening to scan tracks on the magnetic-tape. A pressure element in the cassette, behind the place where the tape is scanned, engages only a part of the width of the tape, including the part along which the track extends.

3 Claims, 6 Drawing Figures

MAGNETIC-TAPE CASSETTE

BACKGROUND OF THE INVENTION

The invention relates to a magnetic-tape cassette for a magnetic tape which extends inside the cassette between two winding hubs along a cassette sidewall, which wall has at least one aperture through which at least one magnetic head for scanning a track on the magnetic tape can be inserted and can be positioned with its head face against the magnetic tape over the full tape-width. The magnetic tape is pressed resiliently against the head face of the magnetic head by an elastic pressure element which is arranged on a support in the cassette and which co-operates with the tape from the inside of the cassette. Such a magnetic tape cassette is for example known from Austrian Pat. No. 352,428 to which U.S. Pat. No. 4,200,250 corresponds.

In order to ensure a correct recording or reproducing process the magnetic tape should be passed along the head face of the magnetic head with a suitable pressure, so that the tape is in close contact with the head face at the location of the head gap which terminates in said head face. This is achieved in the customary manner by means of an elastic pressure element arranged on a support inside the cassette and comprising, for example, a felt pad, which pressure element provides the desired contact pressure under the influence of a spring. This spring may act either on the support of the pressure element or the support itself may be constructed as a spring element. As is common practice such a pressure element is constructed so that it presses the magnetic tape against the head face of the magnetic head over the full width of the tape, for which purpose the width of the pressure element is selected to be slightly greater than the width of the magnetic tape. During transport of the magnetic tape which is pressed against the head face of the magnetic head the spring force providing the required contact pressure has to be overcome, which means that the drive means for the magnetic tape must be capable of producing an adequate force.

SUMMARY OF THE INVENTION

It is the object of the invention to construct a magnetic-tape cassette of the type mentioned in the opening paragraph in such a way that the force to be overcome by the drive means of the magnetic tape when the magnetic tape is pressed against the head face of the magnetic head with the appropriate contact pressure is minimized. This force reduction is of special importance for magnetic-tape cassettes intended for use in battery-operated equipment.

According to the invention this is achieved in that the pressure element is adapted to co-operate with only a part of the width of the magnetic tape, the track on the magnetic tape to be scanned by the magnetic head being extending in said part. This reduces the contact area of the pressure element with the magnetic tape, so that although the spring force is the same the average pressure per unit of area and thus the contact pressure increases. This means that in order to obtain a specific contact pressure a smaller spring force suffices, so that the force to be produced by the drive means for the magnetic tape may be reduced. Since the track on the magnetic tape to be scanned by the magnetic head is situated within that part of the width of the magnetic tape over which the tape co-operates with the pressure element, it is ensured that at the location of the track the magnetic tape is positioned exactly against the head face of the magnetic head, thereby ensuring a correct recording or reproducing process.

The width of the pressure element may for example be selected so that it is only slightly greater than the width of the track on the magnetic tape to be scanned, in which case the spring force which provides the contact pressure for the magnetic tape is minimal. However, it is found to be advantageous if the pressure element which is adapted to co-operate with the magnetic tape over only a part of its width extends at least up to that longitudinal edge of the magnetic tape which is disposed nearest the track which extends in that same part. This ensures that the edge portion of the magnetic tape is not lifted off the head face of the magnetic tape and it provides a particularly reliable contact of the magnetic tape with the head face of the magnetic head and a correct transport of the magnetic tape.

In a cassette which is of the reversible type and which has two apertures and two pressure elements which are disposed mirror-symmetrically relative to the transverse plane of symmetry of the cassette, this plane being perpendicular to the side wall in which the apertures are formed, it is found to be advantageous if the two pressure elements which are each adapted to co-operate with only a part of the width of the magnetic tape are arranged mirror-symmetrically relative to the longitudinal plane of symmetry of the magnetic tape. In this way the magnetic tape is uniformly pressed against the head face of the magnetic head in both positions of the cassette, so that the operating conditions are always the same.

Embodiments of the invention will now be described in more detail, by way of example, with reference to the drawings.

DESCRIPTION OF THE PREFERRED EMBODIMENTS

Figure 1:
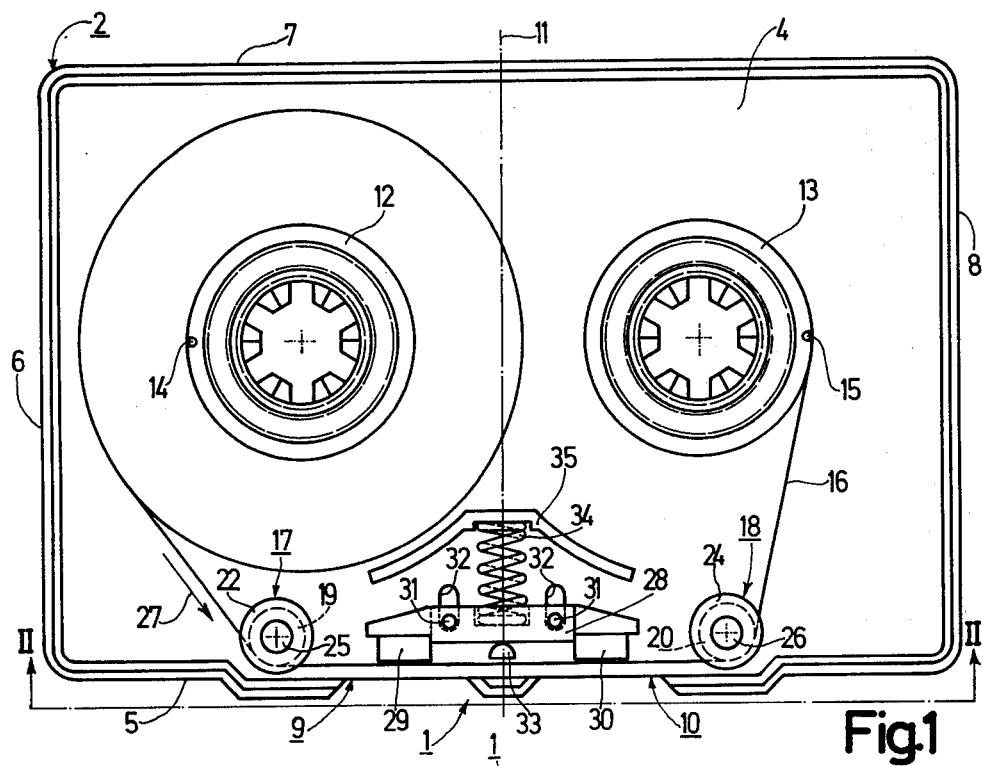
FIG. 1 is a plan view of a magnetic tape cassette whose upper cover is not shown for the sake of clarity.
Figure 2:
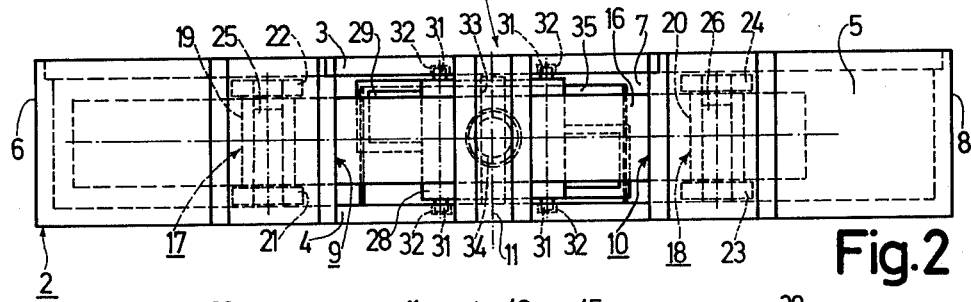
FIG. 2 is a side view of the cassette shown in FIG. 1, taken from the line II—II in FIG. 1.

The magnetic tape cassette 1 shown in FIGS. 1 and 2 comprises a housing section 2 and a cover 3 which can be mounted onto this section. The housing section 2 comprises a bottom portion 4 with side walls 5, 6, 7 and 8, two apertures 9 and 10 being formed in the side wall 5, which apertures are situated mirror-symmetrically relative to the transverse plane of symmetry 11 of the cassette, which plane extends perpendicularly to the side wall 5. In the interior of the cassette two adjacent rotably mounted winding hubs 12 and 13 are arranged, to each of which hubs the ends of a magnetic tape 16 are secured by means of clamping pins 14 and 15 respectively, which magnetic tape extends from the winding hub 12 along the side wall 5 of the cassette 1 to the winding hub 13. In order to guide the magnetic tape at the location of the side wall 5 with the apertures 9 and 10 two guide elements 17 and 18 are arranged mirror-symmetrically relative to the transverse plane of symmetry 11, which elements in the present case comprise tubular portions 19 and 20 respectively and end flanges 21, 22 and 23, 24 respectively. For mounting these tubular portions 19 and 20 in the cassette there are provided pins 25 and 26 respectively which project from the bottom surface 4 of the housing section 2. The end flanges 21, 22 and 23, 24 of said two guide elements 17 and 18 respectively extend beside the longitudinal edges of the magnetic tape 16, so that they provide a rectilinear guidance for the magnetic tape. Obviously, thee guide elements 17 and 18 may also be constructed differently, for example as rotatable rollers or as simple pins.

The apertures 9 and 10 formed in the side wall 5 enable at least one magnetic head to co-operate with the magnetic tape in known manner. As a result of the mirror-symmetrical arrangement of the apertures 9 and 10 relative to the transverse plane of symmetry 11 the cassette may be reversed, permitting two tracks to be scanned in opposite directions by means of one magnetic head whose head gap is disposed within a longitudinal half of the magnetic tape. However, it is alternatively possible to introduce a magnetic head into each of the two apertures 9 and 10 at the same time, so that in known manner the foremost magnetic head viewed in the direction of transport of the magnetic tape may be a recording and/or reproducing head and the other magnetic head may be an erase head. If the normal direction of transport of the magnetic tape is the direction indicated by the arrow 27, the erase head should be introduced into the aperture 9 and the recording and/or reproducing head into the aperture 10. However, alternatively an erase head may be introduced into the aperture 9 only when actually an erase process is to be carried out.

For a correct recording or reproducing process the magnetic tape should be pressed against the head face of the relevant magnetic head. For this purpose a support 28 carrying two elastic pressure elements 29 and 30 is arranged inside the cassette behind the magnetic tape 16, the two pressure elements being disposed mirror-symmetrically relative to the transverse plane of symmetry 11 at the location of the two apertures 9 and 10 respectively. In the present case the support 28 is arranged so as to be movable perpendicularly to the cassette side-wall 5 with the two apertures 9 and 10, for which purpose said support comprises four projections 31 which engage corresponding recesses 32 in the cassette bottom 4 and cover 3 respectively. The movement of the support 28 towards the magnetic tape 16 is limited by a pin 33 which projects from the bottom surface 4, against which pin the support 28 is urged by a spring 34 when no magnetic head is introduced into the apertures 9 and 10, as is apparent from FIG. 1. As can be seen, the spring 34 acts on the support 28 and on an abutment 35 provided inside the housing section 2. The entire arrangement comprosing the support 28, the spring 34 and the abutment 35 is again mirror-symmetrical relative to the transverse plane in symmetry 11, so that the two elastic pressure elements 29 and 30 act in the same way in both positions of the cassette. It is obvious that these two pressure elements 29 and 30 may be arranged inside the cassette in a different manner. For example, for each of the two pressure elements there may be provided a separate support, in which case one common spring or two separate springs may act on said supports. However, such a support may also be formed, in known manner, by a leaf spring, of which both ends are clamped in the cassette.

For a correct recording or reproducing process it is essential, as already stated, that the pressure elements 29 and 30 maintain the magnetic tape in close contact with the head face of a magnetic recording or recording head, for which an adequate contact pressure is required. In the present embodiment this contact pressure is provided by the force of the spring 34. As a result of this spring force, which ensures that the magnetic tape is pressed against the head face of a magnetic head, via the relevant pressure element 29 or 30 the drive means for the transport of the magnetic tape should be capable of producing a specific minimum force in order to pull the magnetic tape between the pressure element and the head face of the magnetic head. Especially in the case of magnetic-tape cassettes intended for use in the battery-operated equipment such a force may present a problem. However, in general a magnetic-tape cassette should also function as smoothly as possible, i.e. the force required for the transport of the magnetic tape should be minimized, because this ensures a more uniform lace-up, which is favourable both for the recording or reproducing process and for the manner in which the magnetic tape is wound onto or unwound from the winding hubs. However, such a smooth operation is required especially if the magnetic tape should co-operate with at least one magnetic head at a high speed, which is for example desirable for the detection of markings on the magnetic tape during fast winding, because the drive means for the magnetic-tape transport should then be capable of producing an even greater force. This means that two contradictory requirements are imposed, namely to provide a maximum contact pressure for the magnetic tape against the magnetic head, in order to ensure a correct recording or reproducing process, and to minimize the contact pressure for the magnetic tape against the magnetic head, in order to enable transport of the magnetic tape with a minimal force.

In order to meet these contradictory requirements in an optimum manner, the pressure elements 29 and 30 are adapted to-co-operate with only a part of the width of the magnetic tape 16, the track on the magnetic tape to be scanned by the magnetic head extending in said part of the tape. In the present embodiment, which concerns a reversible cassette, the two pressure elements 29 and 30, which are each adapted to co-operate with only a part of the width of the magnetic tape, are arranged mirror-symmetrically relative to the longitudinal plane of symmetry of the record carrier, so that they act in the same way in both operating positions of the cassette. Moreover, the pressure elements 29 and 30, which are adapted to co-operate each with only a part of the width of the magnetic tape, each extend at least up to that longitudinal edge of the magnetic tape which is nearest the track extending in this part of the tape.

Figure 3:
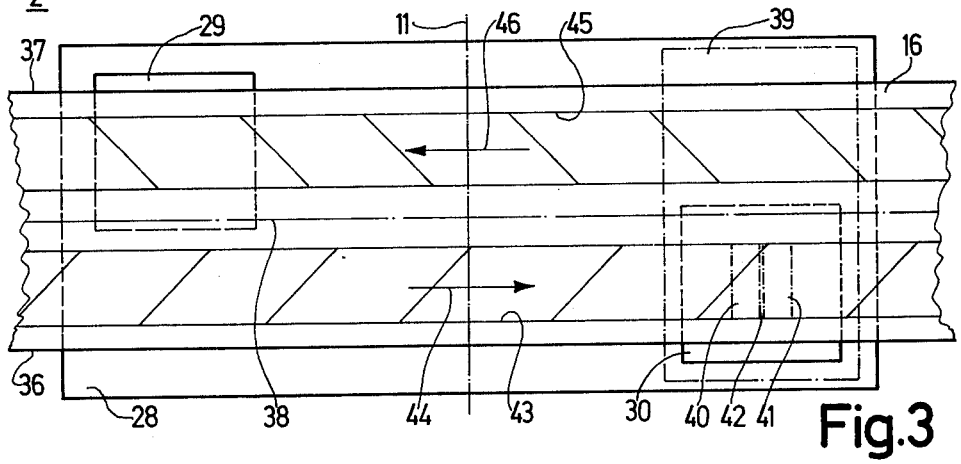
FIG. 3 is a schematic view on an enlarged scale of an embodiment in which the two pressure elements each extend up to a longitudinal edge of the magnetic tape, showing the co-operation of the pressure elements with the magnetic tape, the location of the tracks and the position of a magnetic head.

For the sake of clarity the last-mentioned situation is schematically represented by FIG. 3. The support 28 for the pressure elements 29 and 30 is simply represented by a block. The two longitudinal edges of the magnetic tape 16 are designated 36 and 37 and its longitudinal plane of symmetry is designated 38. A magnetic head introduced into the aperture 10 is represented by the dashdot lines 39, and it can be seen that its head face is wider than the magnetic tape 16 in order to ensure that the magnetic tape is in contact with the head face of the magnetic head over its full width, which is necessary for a uniform transport of the magnetic tape. In the customary manner this magnetic head 39 comprises two magnet cores 40 and 41 which terminate in its head face, between which cores a head gap 42 is formed. The location and the width of the two magnet cores and thus the location and width of the head gap of the magnetic head is selected so that this head scans a track 43, shown hatched, in the longitudinal half of the magnetic tape corresponding to the longitudinal tape edge 36 when the magnetic tape is moved in the same direction as the arrow 44. At the location of the magnetic head 39 the pressure element 30 presses the magnetic tape against the head face of the magnetic head over a part of the width of said tape only. This part is determined by the width selected for the pressure element 30 and its position relative to the magnetic tape and the magnetic head respectively. In the present embodiment the pressure element 30 extends slightly above the longitudinal edge 36 of the magnetic tape 16, whilst in the other direction it extends slightly above the longitudinal plane of symmetry 38 of the magnetic tape 16. However, in principle the pressure element 30 may extend to a location slightly before the longitudinal plane of symmetry 38 of the magnetic tape 16. Thus, this means that a part of the width of the magnetic tape is covered in which the track 43 extends. As a result of the mirror-symmetrical construction and arrangement of the pressure element 29 relative to the pressure element 30, it is achieved that after reversing the magnetic-tape cassette the pressure element 29 occupies the position of the pressure element 30 relative to the magnetic head 39, so that this head scans a track 45 situated in the other longitudinal half of the magnetic tape bounded by the longitudinal edge 37, which is again indicated by the hatching and by the arrow 46.

In this way it is achieved that each of the two pressure elements 29 and 30 exert pressure on the magnetic tape over only a part of the width of this tape and not over its full width, so that as a result of the smaller area over which the relevant pressure element is in contact with the magnetic tape the average pressure per unit of area is higher. Thus, in order to obtain a specific contact pressure for the magnetic tape on the head face of the magnetic head a proportionally smaller spring force is required, as a result of which the force for pulling the magnetic tape between the pressure element and the head face of the magnetic head is also reduced and consequently the force to be produced by the drive means for the magnetic-tape transport may be smaller. In contradistinction to the opinion held until now that the magnetic tape should be pressed against the head face of the magnetic head over its full width the method of pressing the magnetic tape in position in accordance with the invention, namely over a part its width only, provides such a good contact that a correct recording or reproducing process can be achieved.

As can be seen in FIG. 3, it has been assumed that only one magnetic head 39 is used and only one of the two pressure elements 30 or 29 is operative depending on the operating position of the magnetic-tape cassette. However, it is obvious that it is also possible to introduce a magnetic head into each of the apertures 9 and 10 at the same time. Such a further magnetic head may then serve as erase head, when its head gap is situated at the same level as the head gap 42 of the magnetic head 39, so that it scans the same track on the magnetic tape as the magnetic head 39. The pressure element 29 then would not press the magnetic tape against the head face of this further magnetic head at the location of its head gap but at the adjacent location situated in the other longitudinal half of the magnetic tape; however, for an erase process this is not a disadvantage because, as is known, the magnetic fields used for erasing are substantially stronger than for recording or reproduction and it is therefore not essential to press the magnetic tape against an erase head at the location of its head gap.

Figure 4:
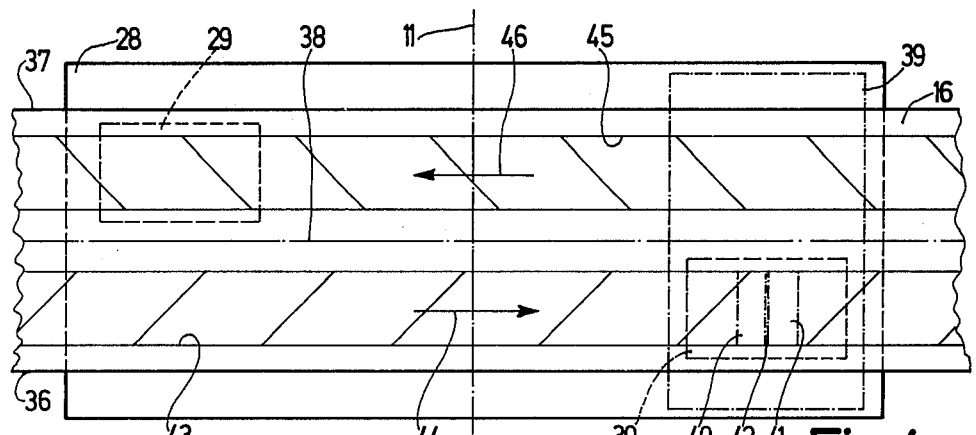
FIG. 4 is a schematic view similar to FIG. 3, of an embodiment in which the pressure elements are slightly wider than the track on the magnetic tape to be scanned by the magnetic head.

As already stated, the two pressure elements 30 and 29 in the embodiment described in the foregoing each also cover a longitudinal edge 36 and 37 respectively of the magnetic tape, whch precludes fluttering of the magnetic tape at the location of the relevant longitudinal edge and provides a particularly satisfactory contact of the magnetic tape with the head face of the magnetic head at the location of its head gap. Such a step is effective but is not essential. Therefore, in the embodiment shown in FIG. 4, the pressure elements 30 and 29 are made only slightly wider than the tracks 43 and 45 respectively on the magnetic tape 16, so that the longitudinal edges 36 and 37 of the magnetic tape are not covered and the pressure elements do not extend beyond the longitudinal plane of symmetry 38 of the magnetic tape. As a result of this, the pressure per unit of area provided by the pressure elements 30 and 29 respectively is even slightly greater than in the embodiment described in the foregoing, so that in order to obtain a specific contact pressure of the magnetic tape on the head face of a magnetic head the spring force acting on the pressure elements may now be reduced even further.

Figure 5:
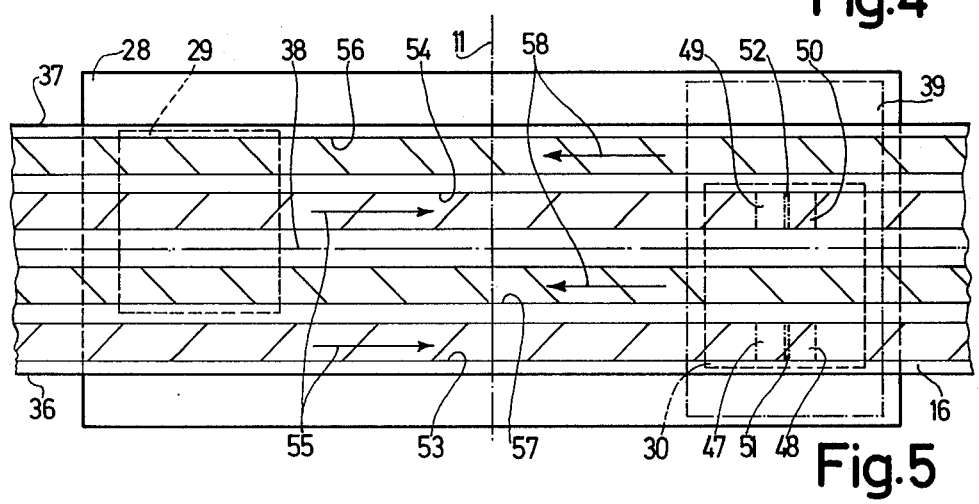
FIG. 5 is a schematic view similar to FIG. 3, of an embodiment in which two tracks on the magnetic tape are scanned in each of two directions, for example during stereophonic recording or reproduction, the pressure elements being only slightly wider than the two tracks on the magnetic tape to be scanned by the magnetic head.

It is obvious that the steps in accordance with the invention may not only be used in conjunction with magnetic-tape cassettes of the two-track system as described in the foregoing but also in conjunction with other track systems such as single-track or multi-track systems. By way of illustration FIG. 5 shows an embodiment for a four-track system as for example employed in stereophonic recording or reproduction. A magnetic head 39 used in such a system comprises two magnetic circuits which terminate in its head face and which are spaced from each other transversely of the direction of transport of the magnetic tape, which each scan a track on the record carrier. For this purpose the magnetic head 39 comprises two magnet cores 47 and 48 and two further magnet cores 49 and 50, between which a head gap 51 and 52 respectively is formed. The head gap 51 is situated at such a level that it scans a track 53 on the magnetic tape 16 which extends close to the longitudinal edge 36 of the magnetic tape. However, the head gap 52 is situated at such a level that it scans a track 54 which is situated in that longitudinal half of the magnetic tape which is bounded by the longitudinal edge 37 of said tape and which is disposed nearest the longitudinal plane of symmetry 38 of the magnetic tape. These two tracks 53 and 54 are scanned simultaneously in the scanning direction 55. After the cassette has been reversed the same head gaps 51 and 52 scan two further tracks 56 and 57 on the magnetic tape, the track 56 being situated nearest the longitudinal edge 37 of the magnetic tape and the track 57 nearest the longitudinal plane of symmetry 38 of the magnetic tape. For these two tracks 56 and 57 the scanning direction 58 obtains. Since now two tracks, namely 53, 54 and 56, 57 respectively, are scanned at the same time, the pressure elements 30 and 29 have such a width that they extend slightly beyond the tracks to be scanned simultaneously. The pressure element 30 corresponds to the tracks 53 and 54 and the pressure element 29 to the tracks 56 and 57. In this way it is ensured again that the pressure elements 30 and 29 do not cover the entire width of the magnetic tape, but only a part of the width of the magnetic tape, as a result of which their contact area with the magnetic tape is again reduced and consequently the average pressure per unit of area is increased, so that in order to obtain a specific contact pressure for the magnetic tape on the head face of a magnetic head the spring force which acts on the pressure element may be reduced.

In the present embodiment a common pressure element is associated with the two tracks to be scanned simultaneously, which element co-operates with that part of the width of the magnetic tape which contains the two tracks to be scanned simultaneously, so that the part of the magnetic-tape width between these two tracks to be scanned simultaneously is also covered, which part also contains one of the other two tracks 57 and 54 to be scanned simultaneously but this track is not scanned when the two first-mentioned tracks to be scanned simultaneously are scanned. This means that the two pressure elements also cover a part of the width of the magnetic tape in which a track extends which is not scanned. Alternatively, at the location of this part of the width of the magnetic tape in which the one track which is not scanned extends the magnetic tape may not be pressed against the head face, which may simply be achieved by providing a separate pressure element for each of the two tracks to be scanned simultaneously, the width of this element being only slightly greater than the actual width of the relevant track. This would result in a further reduction of the areas where the pressure elements co-operate with the magnetic tape.

Figure 6:
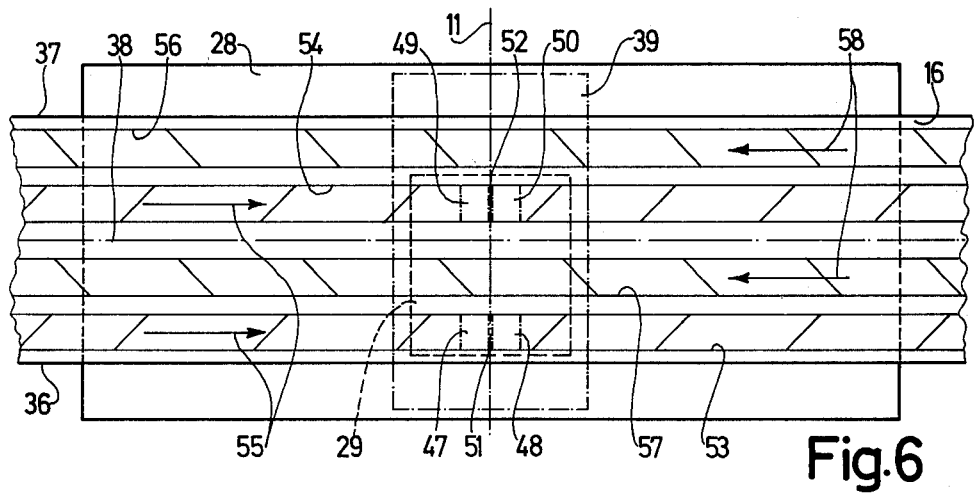
FIG. 6 is a schematic view of a modification of the embodiment shown in FIG. 5, in which the magnetic head co-operates with the magnetic tape at the location of the transverse plane of symmetry of the magnetic-tape cassette and which therefore comprises only one pressure element.

The embodiment shown in FIG. 6 also relates to a track system similar to that in the embodiment shown in FIG. 5. However, in this case the magnetic head 39 is arranged so that its head gaps 51 and 52 extend in the transverse plane of symmetry 11. This means that also in the case of a reversible cassette the cassette needs to have only one aperture for the passage of the magnetic head 39, so that also only one pressure element, designated 29, is required. In the same way as in the embodiment shown in FIG. 5 the width of this pressure element 29 is selected so that it covers the part of the width of the magnetic tape in which the two tracks 53, 54 or 56, 57 to be scanned simultaneously extend. If again a further magnetic head, for example an erase head, should co-operate with the magnetic tape, two further apertures which are situated mirror-symmetrically relative to the transverse plane of symmetry should be formed in the relevant side wall of the cassette, which further magnetic head can then pass through one of these apertures depending on the operating position of the cassette. If this further magnetic head is an erase head, no further pressure elements are required, so that it suffices to use a single pressure element.

As will be apparent from the foregoing, various modifications to the embodiments described are possible without departing from the scope of the invention. This applies in particular to the construction of the cassette itself, the track system used, and the manner in which the elastic pressure elements are pressed against the magnet tape.

What is claimed is:

1. A magnetic-tape cassette for storing information in the form of a plurality of information tracks on a magnetic tape, each track extending over less than the entire width of the tape, comprising a cassette side wall having at least one aperture therethrough, two winding hubs and a length of magnetic-tape wound on said hubs and extending past said aperture, an elastic pressure element located in the cassette, a support on which said element is arranged, and means for pressing said element against the tape so that the tape is pressed resiliently against the head face of a magnetic head which has been inserted through the aperture in such a way that the head face engages the magnetic-tape over the full tape width, characterized by comprising two said pressure elements, each pressure element engaging only a part of the width of the magnetic tape, the track to be scanned extending in said part.

2. A cassette as claimed in claim 1, characterized in that the pressure element which is adapted to co-operate with the magnetic tape over only a part of its width extends at least up to that longitudinal edge of the magnetic tape which is disposed nearest the track which extends in said part.

3. A cassette as claimed in claim 2 or 1, which is reversible and which has two apertures and two pressure elements which are disposed mirror-symmetrically relative to the transverse plane of symmetry of the cassette, which plane extends perpendicularly to the side wall in which the apertures are formed, characterized in that the pressure elements which are each adapted to co-operate with only a part of the width of the magnetic tape are arranged mirror-symmetrically relative to the longitudinal plane of symmetry of the magnetic tape.

* * * * *